US006917809B2

(12) United States Patent
Horwath et al.

(10) Patent No.: US 6,917,809 B2
(45) Date of Patent: Jul. 12, 2005

(54) METHOD FOR AUTOMATICALLY SORTING THE NEIGHBOR LIST OF A CELL IN A COMMUNICATIONS SYSTEM

(75) Inventors: George J. Horwath, Norridge, IL (US); Bogdan R. Nedelcu, Algonquin, IL (US); Jeffrey D. Bonta, Arlington Heights, IL (US); Matthew J. Dillon, Oxfordshire (GB)

(73) Assignee: Motorola, Inc., Schaumburg, IL (US)

( * ) Notice: Subject to any disclaimer, the term of this patent is extended or adjusted under 35 U.S.C. 154(b) by 582 days.

(21) Appl. No.: 10/003,499

(22) Filed: Oct. 23, 2001

(65) Prior Publication Data

US 2003/0078043 A1 Apr. 24, 2003

(51) Int. Cl.[7] .............................. H04Q 7/20; H04Q 7/00
(52) U.S. Cl. .................. 455/436; 455/437; 455/435.2; 455/524; 455/525; 370/332; 370/331
(58) Field of Search ................ 455/522, 525, 455/439, 443, 442, 512, 518, 461, 436, 437, 435.2, 435.3, 517, 524, 423, 438, 432.1, 432.2; 370/332, 331

(56) References Cited

U.S. PATENT DOCUMENTS

| 5,101,501 | A | * | 3/1992 | Gilhousen et al. ........... 455/442 |
| 5,680,395 | A | * | 10/1997 | Weaver et al. ............... 370/331 |
| 5,737,704 | A | * | 4/1998 | Jin et al. ..................... 455/450 |
| 5,842,127 | A | * | 11/1998 | Pashtan et al. ........... 455/435.3 |
| 5,982,758 | A | * | 11/1999 | Hamdy ........................ 370/331 |
| 5,987,332 | A | * | 11/1999 | Gettleman et al. .......... 455/518 |
| 6,055,428 | A | * | 4/2000 | Soliman ...................... 455/437 |
| 6,112,089 | A | * | 8/2000 | Satarasinghe ................ 455/437 |
| 6,112,092 | A | * | 8/2000 | Benveniste .................. 455/450 |
| 6,154,455 | A | * | 11/2000 | Mekkoth et al. ............ 370/342 |
| 6,321,089 | B1 | * | 11/2001 | Han ............................ 455/438 |
| 6,360,098 | B1 | * | 3/2002 | Ganesh et al. .............. 455/436 |
| 6,370,377 | B1 | * | 4/2002 | Take et al. ................ 455/432.1 |
| 6,427,075 | B1 | * | 7/2002 | Burg et al. ............... 455/422.1 |
| 6,430,414 | B1 | * | 8/2002 | Sorokine et al. ............ 455/442 |
| 6,456,606 | B1 | * | 9/2002 | Terasawa .................... 370/331 |
| 6,526,283 | B1 | * | 2/2003 | Jang ........................ 455/456.5 |
| 6,725,052 | B1 | * | 4/2004 | Raith .......................... 455/518 |
| 6,801,512 | B1 | * | 10/2004 | Cudak et al. ............... 370/332 |
| 2001/0026542 | A1 | * | 10/2001 | Kusaka et al. | |
| 2002/0006805 | A1 | * | 1/2002 | New et al. .................. 455/525 |
| 2002/0090965 | A1 | * | 7/2002 | Chen et al. ................. 455/522 |

FOREIGN PATENT DOCUMENTS

EP          0 926 915 A2     6/1999

\* cited by examiner

Primary Examiner—William Trost
Assistant Examiner—Kiet Doan
(74) Attorney, Agent, or Firm—Lalita W. Pace

(57) ABSTRACT

A method of automatically prioritizing cells in a neighbor list of a communications system. The priority is defined as the number of times a cell in the neighbor list has been added to the active set. Cells that have been added to the active set more often are given a higher priority. Such higher priority cells are considered first for addition to the monitored set because they are more likely to successfully move from the monitored set to the active set.

10 Claims, 6 Drawing Sheets

FIG. 3

NEIGHBOR LIST FOR CELL P ⟋302

| CELL | COUNTER SET A | COUNTER SET B |
|---|---|---|
| D | 0 | 0 |
| C | 0 | 0 |
| M | 0 | 0 |

NEIGHBOR LIST
COUNTER      0

X_ACTIVE=COUNTER SET A
X_STANDBY=COUNTER SET B

CELL C ADDED TO ACTIVE SET →

NEIGHBOR LIST FOR CELL P ⟋304

| CELL | COUNTER SET A | COUNTER SET B |
|---|---|---|
| D | 0 | 0 |
| C | 1 | 0 |
| M | 0 | 0 |

NEIGHBOR LIST
COUNTER      1            0

X_ACTIVE=COUNTER SET A
X_STANDBY=COUNTER SET B

FIG. 4

NEIGHBOR LIST FOR CELL P ⟋402

| CELL | COUNTER SET A | COUNTER SET B |
|---|---|---|
| D | 195 | 0 |
| C | 275 | 0 |
| M | 203 | 0 |

NEIGHBOR LIST
COUNTER      673           0

X_ACTIVE=COUNTER SET A
X_STANDBY=COUNTER SET B

CELL C ADDED TO ACTIVE SET →

NEIGHBOR LIST FOR CELL P ⟋404

| CELL | COUNTER SET A | COUNTER SET B |
|---|---|---|
| D | 195 | 0 |
| C | 276 | 0 |
| M | 203 | 0 |

NEIGHBOR LIST
COUNTER      674           0

X_ACTIVE=COUNTER SET A
X_STANDBY=COUNTER SET B

FIG. 5

NEIGHBOR LIST FOR CELL P — 502

| CELL | COUNTER SET A | COUNTER SET B |
|---|---|---|
| D | 195 | 0 |
| C | 299 | 0 |
| M | 203 | 0 |

NEIGHBOR LIST
COUNTER   697                  0

X_ACTIVE=COUNTER SET A
X_STANDBY=COUNTER SET B

CELL C ADDED TO ACTIVE SET →

NEIGHBOR LIST FOR CELL P — 504

| CELL | COUNTER SET A | COUNTER SET B |
|---|---|---|
| D | 195 | 0 |
| C | 300 | 0 |
| M | 203 | 0 |

NEIGHBOR LIST
COUNTER   698                  0

X_ACTIVE=COUNTER SET B
X_STANDBY=COUNTER SET A

FIG. 6

NEIGHBOR LIST FOR CELL P — 602

| CELL | COUNTER SET A | COUNTER SET B |
|---|---|---|
| D | 195 | 130 |
| C | 300 | 19 |
| M | 203 | 250 |

NEIGHBOR LIST
COUNTER   698                  399

X_ACTIVE=COUNTER SET B
X_STANDBY=COUNTER SET A

CELL C ADDED TO ACTIVE SET →

NEIGHBOR LIST FOR CELL P — 604

| CELL | COUNTER SET A | COUNTER SET B |
|---|---|---|
| D | 195 | 130 |
| C | 300 | 20 |
| M | 203 | 250 |

NEIGHBOR LIST
COUNTER   698                  400

X_ACTIVE=COUNTER SET B
X_STANDBY=COUNTER SET A

FIG. 7

NEIGHBOR LIST FOR CELL P — 702

| CELL | COUNTER SET A | COUNTER SET B |
|---|---|---|
| D | 195 | 150 |
| C | 300 | 50 |
| M | 203 | 299 |

NEIGHBOR LIST
COUNTER  698                      499

X_ACTIVE=COUNTER SET B
X_STANDBY=COUNTER SET A

CELL C ADDED TO ACTIVE SET →

NEIGHBOR LIST FOR CELL P — 704

| CELL | COUNTER SET A | COUNTER SET B |
|---|---|---|
| D | 195 | 150 |
| C | 300 | 51 |
| M | 203 | 299 |

NEIGHBOR LIST
COUNTER  698                      500

X_ACTIVE=COUNTER SET B
X_STANDBY=COUNTER SET A

FIG. 8

NEIGHBOR LIST FOR CELL P — 802

| CELL | COUNTER SET A | COUNTER SET B |
|---|---|---|
| D | 195 | 150 |
| C | 300 | 51 |
| M | 203 | 299 |

NEIGHBOR LIST
COUNTER  698                      500

X_ACTIVE=COUNTER SET B
X_STANDBY=COUNTER SET A

CELL M ADDED TO ACTIVE SET →

NEIGHBOR LIST FOR CELL P — 804

| CELL | COUNTER SET A | COUNTER SET B |
|---|---|---|
| D | 0 | 130 |
| C | 0 | 51 |
| M | 0 | 300 |

NEIGHBOR LIST
COUNTER  0                        501

X_ACTIVE=COUNTER SET A
X_STANDBY=COUNTER SET B

METHOD FOR AUTOMATICALLY SORTING THE NEIGHBOR LIST OF A CELL IN A COMMUNICATIONS SYSTEM

FIELD OF THE INVENTION

The present invention relates generally to the field of communication systems, and more particularly, to a method of sorting the neighbor list of a cell in a communications system.

BACKGROUND OF THE INVENTION

As shown in FIG. 1, a Universal Mobile Telecommunications System (UMTS) 100 includes a Universal Terrestrial Radio Access Network (UTRAN) in communication with User Equipment (UE). The UTRAN includes a Radio Network Controller (RNC). Further details regarding the UMTS can be ascertained from sections 5 and 6 of 3GPP TS 25.401 v4.0.0 (2001-03).

In the UMTS, the UE communicates with the UTRAN via cells to exchange of user information. In the UMTS, a cell is defined as a Radio Network object that can be uniquely identified by a UE from a cell ID that is broadcasted over a geographical area. In an effort to maintain continuous communication with the UTRAN, the UE monitors four sets of cells—the Active Set, Monitored Set, Detected Set and Virtual Active Set. The Active Set includes UTRAN cells with which the UE is in soft or softer handover with. Cells within the Active Set are active cells, while those not in the Active Set are non-active cells. User information is exchanged between the UE and UTRAN through the active cells. The Active Set contains only UTRAN cells and the cells are all under the same UMTS frequency.

The Monitored Set includes cells not currently in the Active Set that the UE is monitoring for handover according to a neighbor list assigned by the UTRAN. The Monitored Set may contain UTRAN and Global System for Mobile Communications (GSM) cells. The UTRAN cells may be under different UMTS frequencies. The Detected Set includes cells that are not in the Active Set or Monitored Set, but which are detected by the UE without RNC direction. In other words, the UE discovers these cells on its own, rather than according to a neighbor list assigned by the UTRAN. The UE reports only detected cells (UTRAN cells only) that are under the same frequency as the active cells (used frequency) and only when in a particular state. The Virtual Active Set is an Active Set associated with a non-used frequency. Cells in the Virtual Active Set are UTRAN cells that the UE is measuring for potential inter-frequency handover (hard handover). These cells are managed as a virtual active set using intra-frequency measurement criteria and events. After execution of the hard handover, the Virtual Active Set becomes the Active Set.

Each cell in the Active Set has a neighbor list of cells that includes cells that are likely candidates for handover. These cells are used to construct the Monitored Set. Currently, cells in the neighbor list are prioritized by the system operator when the list is provisioned. The priority may or may not be based on the likelihood of the cells being promoted to the Active Set. Thus, there is a need for a method of automatically ordering the neighbor list of a cell in the Active Set according to the likelihood that the cell will be promoted to the Active Set.

BRIEF DESCRIPTION OF THE DRAWINGS

FIG. 3 is an example of the method of FIG. 2 when a cell C is added to the active set immediately after system startup.

FIG. 4 is an example of the method of FIG. 2 when cell C is added to the active set some time after system startup but before the first swap of counter set A and counter set B.

FIG. 5 is an example of the method of FIG. 2 when cell C is added to the active set some time after system startup but before the first swap of counter set A and counter set B, with counter set A reaching its maximum value.

FIG. 6 is an example of the method of FIG. 2 when cell C is added to the active set some time after the first swap of counter set A and counter set B.

FIG. 7 is an example of the method of FIG. 2 when cell C is added to the active set some time after the first swap of counter set A and counter set B, with the neighbor list counter for counter set B reaching its predetermined value.

FIG. 8 is an example of the method of FIG. 2 when a cell M is added to the active set some time after the first swap of counter set A and counter set B, with a cell counter in counter set B reaching its maximum value.

DETAILED DESCRIPTION OF THE DRAWINGS

The present invention provides a method of automatically prioritizing the order of cells in a neighbor list. In the preferred embodiment, the cells are prioritized based on the number of times a cell in the neighbor list has been added to the active set while the owner of the neighbor list is in the active set. A cell that has been added to the active set the most is given the highest priority. A cell that has been added to the active set the least is given the lowest priority. The higher priority cells are considered first for addition to the monitored set because they are more likely to be promoted from the monitored set to the active set. The method of the present invention simplifies ordering of the neighbor list by automating the process. This simplification, in turn, leads to the reduction of dropped calls and also improves the quality of communications. Automatic ordering allows the cells that are most frequently added to the active set to increase its priority in the neighbor list. This greatly increases the chances that those cells will be included in the monitored set. While the system operator may make a first best guess when provisioning the database, the automatic ordering fine tunes that guess to ensure that the cells added most successfully to the active set are included in the monitored set. By implementing an ongoing process, the system can self adjust to changing conditions.

Figure 1:
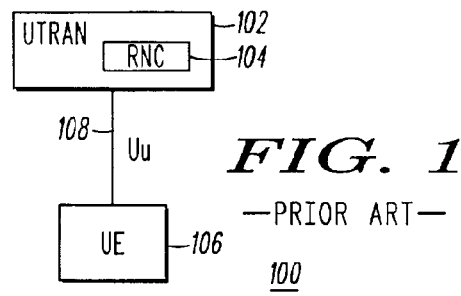
FIG. 1 is a block diagram of a system that can be used to implement the preferred embodiment of the present invention.

The preferred embodiment of the automated sorting method of the present invention is described with reference to a UMTS. However, it will be appreciated by one of ordinary skill in the art that the invention can be implemented in any communications system. Referring to FIG. 1, in the UMTS 100, the method is implemented in the RNC 104 by any microprocessor or computer commonly known in the art. The method is performed on an individual neighbor list basis and is controlled by the value of a parameter called "Neighbor List Auto Sort." If the Neighbor List Auto Sort parameter is enabled for a particular neighbor list, that neighbor list will be sorted in accordance with the invention. If the parameter is disabled, the order of the neighbor list as stored in the RNC's database (not shown)

will be used. Typically, the system operator specifies the order of the neighbor list when the list is provisioned.

In establishing the priority for automatic sorting, the method uses a cell counter for each cell within each neighbor list to track the number of times the cell is added to the active set while the owner of the neighbor list is in the active set. Collectively, the cell counters for the cells in a particular neighbor list are referred to as a counter set. In the preferred embodiment, each cell in a neighbor list has two counters. Because each counter can count to a finite maximum value, the counters are duplicated to prevent an overflow situation. Thus, the method uses to counter sets to track the number of times cells in a neighbor list are added to the active set. Herein, the counter sets are referred to as counter set A and counter set B. As will be described with reference to FIG. 2 later herein, only counter set A or counter set B is active at any given time. If the active cell counters for a neighbor list is counter set A, counter set B is considered standby. Likewise, if the active cell counters for a neighbor list is counter set B, counter set A is considered standby. When any individual cell counter in a counter set (A or B) reaches its maximum value, the standby counter set is cleared and the active and standby counter sets are swapped. In other words, if a counter in counter set A reaches its maximum value, counter set B is cleared and becomes the active counter set. This swapping of the counters continues throughout the process each time an individual cell counter in a counter set reaches its maximum value.

In addition to each neighbor list having two cell counter sets, each neighbor list has two neighbor list counters—a neighbor list counter for counter set A and a neighbor list counter for counter set B. The neighbor list counter keeps track of the number of times any cell in the counter set (A or B) is added to the active set. After system startup, the cell counter sets and neighbor list counters are set to zero. To produce an accurate priority sorting of a cell's neighbor list, the method of the present invention prioritizes the list when one of the neighbor list counters reaches a predetermined value, preferably five hundred (500). In this manner, the method waits until the cells in a neighbor list have been added to the active set 500 times (collectively) before prioritizing the list. Until the neighbor list counter reaches the predetermined value, the order of cells in a neighbor list is obtained from a database in the RNC 104 (FIG. 1).

Figure 2A:
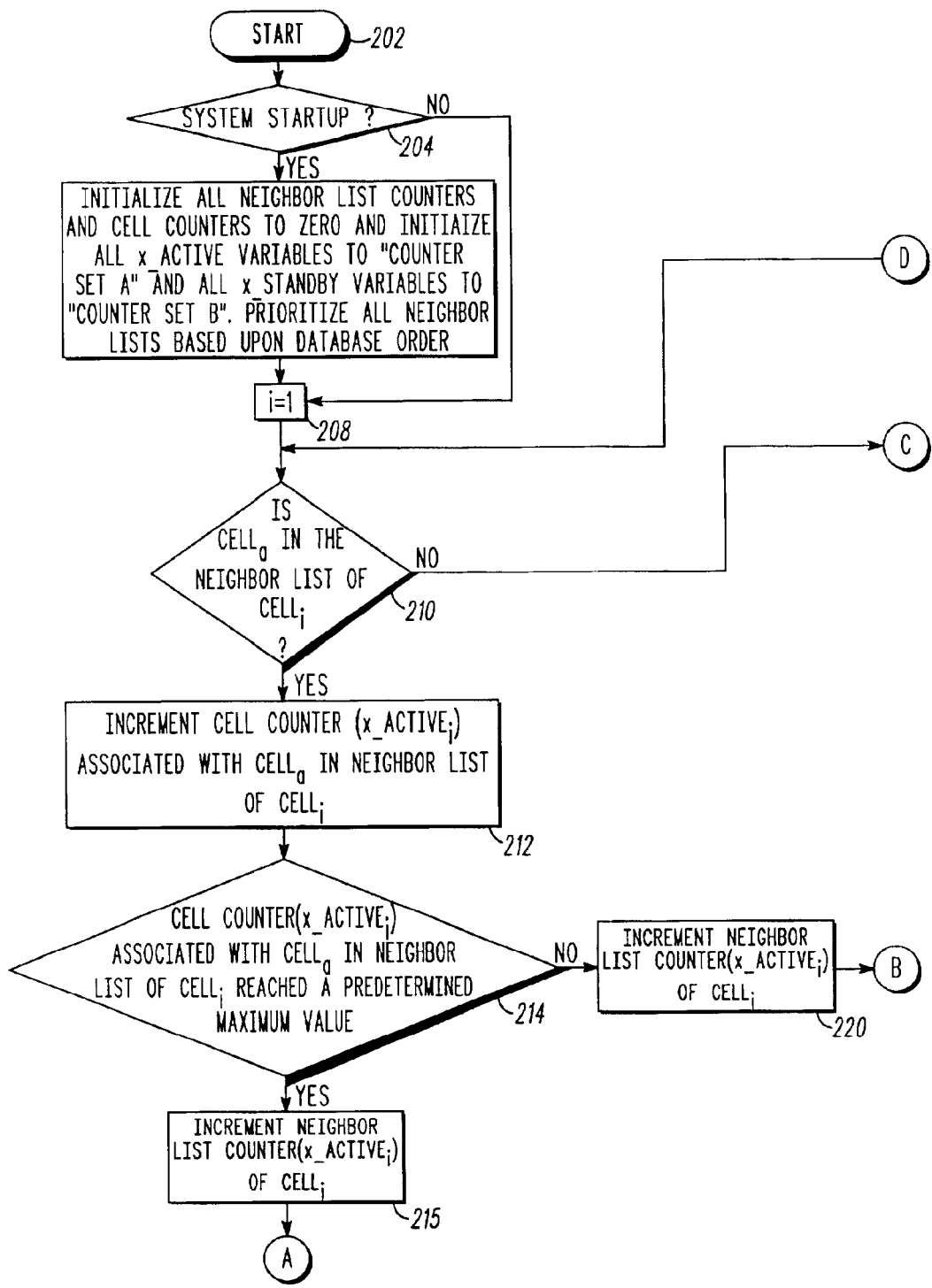
FIGS. 2A and 2B are a flow diagram of the preferred embodiment of the method of the present invention.
Figure 2B:
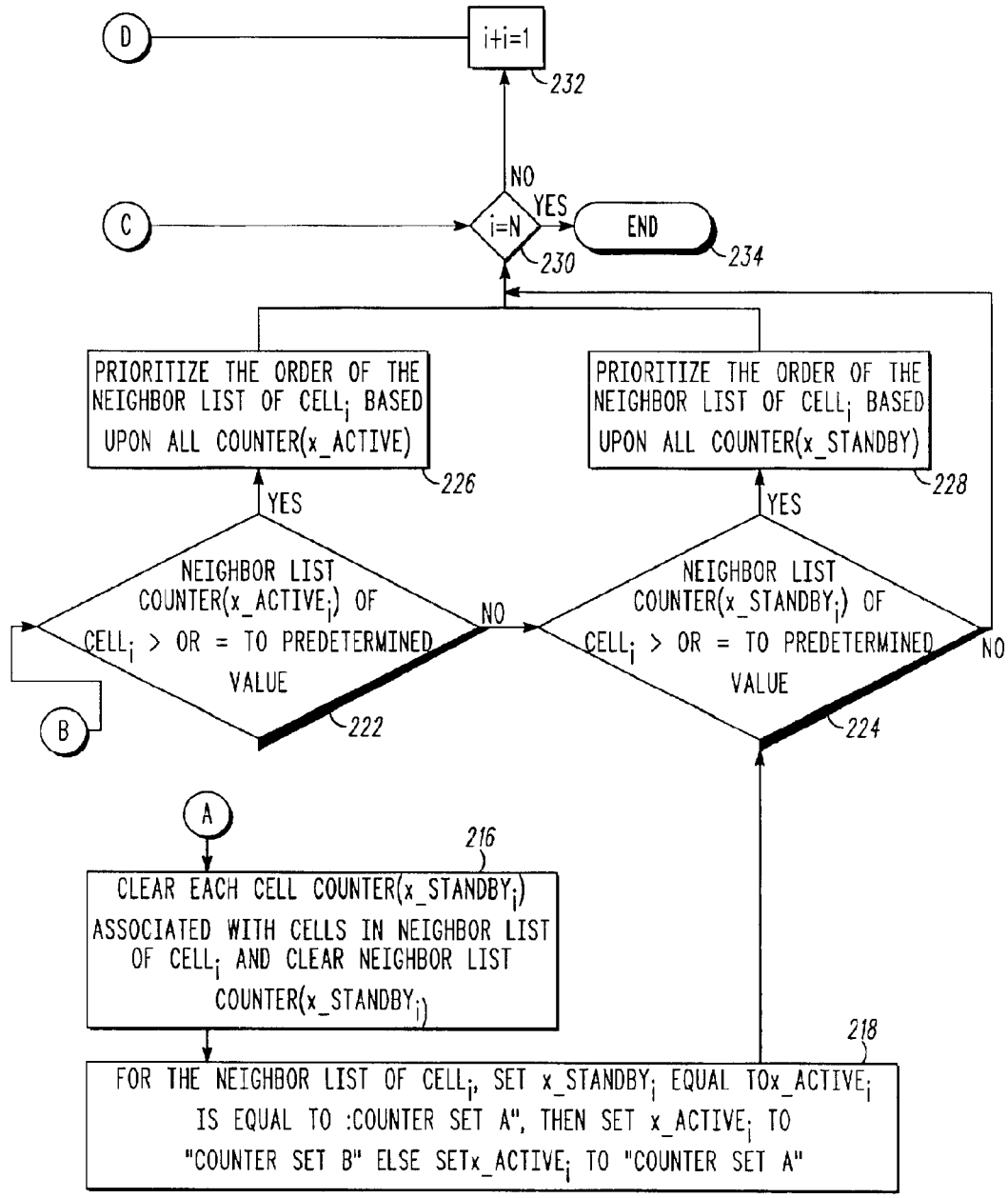

Referring to the flowchart of FIGS. 2A and 2B (referred to collectively as FIG. 2), the method of the present invention begins when a cell is added to the active set. At step 202, the method begins. At step 204, the method determines whether the cell was added to the active set immediately after system startup. If the answer is yes, at step 206, the method initializes all neighbor list counters and cell counters (counter set A and counter set B) to zero. Also, the method initializes the active cell counters as counter set A and the standby cell counters as counter set B. Finally, the method prioritizes all neighbor lists according to the order in the RNC database. At step 208, the method initializes a variable "i" to 1. Variable "i" is used as a pointer to a particular cell already in the active set. In the first instance at step 208, "i" points to the first cell already in the active set.

At step 210, the method determines whether the cell just added to the active set (cell$_a$) is in the neighbor list of the first cell already in the active set (cell$_i$, where i=1). If cell$_a$ is not in the neighbor list of cell$_i$, the method determines whether "i" currently points to the last cell (N) already in the active set (step 230). If the answer is yes, the method ends at step 234. If the answer is no, the method increments "i" (step 232) and proceeds to step 210 to continue determining whether cell$_a$ is in the neighbor list of other cells already in the active set. At step 210, if the method determines that cell$_a$ is in the neighbor list of cell$_i$, it increments the active cell counter (at this point, counter in counter set A) associated with cell$_a$ in the neighbor list of cell$_i$. Next, at step 214, the method determines whether the counter incremented in step 212 has reached its maximum value. If the counter incremented in step 212 has reached its maximum value, at step 215, the method increments the neighbor list counter for the active counter set. At step 216, the method prepares to swap the active and standby counters. In particular, the method clears each standby cell counter (at this point, counter set B) associated with the cells in the neighbor list of cell$_i$ (step 216). At step 216, the method also clears the standby neighbor list counter for the neighbor list of cell$_i$. At step 218, for the neighbor list of cell$_i$, the method swaps the active and standby counters. At this point, counter set A becomes standby and counter set B becomes active. (Of course, later in the process the situation may be different and counter set B would again become standby and counter set A would again become active.) From step 218, the method proceeds to step 224. Step 224 is described in the next paragraph.

Referring back to step 214, if the method determines that the counter incremented in step 212 has not reached its maximum value, it increments the active neighbor list counter for the neighbor list of cell$_i$ (step 220). At step 222, the method determines whether the neighbor list counter incremented in step 220 has reached the predetermined value. If the answer is yes, at step 226, the method prioritizes the order of the neighbor list of cell$_i$ based on the active cell counters (counter set A or counter set B). Next, the method proceeds to step 230 and continues processing as previously described. If at step 222 the answer is no, the method proceeds to step 224. At step 224, the method determines whether the standby neighbor list counter for the neighbor list of cell$_i$ has reached its predetermined value. If the answer is no, the method proceeds to step 230 and continues processing as previously described. It should be noted that when neither of the active or standby cell counters can be used to prioritize the neighbor list, the priority is based on the order in the RNC 104 (FIG. 1) database.

Referring back to step 224, if the standby neighbor list counter for the neighbor list of cell$_i$ has reached its predetermined value, at step 228, the method prioritizes the order of the neighbor list of cell$_i$ based on the standby cell counters (counter set A or B). Next, the method proceeds to step 230 and continues processing as previously described.

Once the method has prioritized all "N" neighbor lists, the Monitored Set can be constructed. In the preferred embodiment, whenever a new Monitored Set is constructed for a MS, the neighbor lists for all cells in the Active Set are concatenated in a round robin fashion using an order based on the priority of the cells in each neighbor list. This technique is illustrated in the examples that follow.

FIGS. 3–8 provide examples of the method of the present invention in accordance with the flowchart of FIG. 2 when a cell is added to the active set under different conditions. For simplicity of explanation, the following assumptions are made: (1) cell P is the first cell already in the active set; (2) the maximum value for the cell counters is 300; and (3) the predetermined value for the neighbor list counters is 500.

FIG. 3 provides an example of the method when a cell C is added to the active set immediately after system startup. According to the flow chart of FIG. 2, the method follows the "yes" path at step 204. At step 206, the method initializes all neighbor list counters and cell counters (counter set A and counter set B) to zero, and initializes the active cell counters as counter set A and the standby cell counters as counter set B. This is shown in block 302 of FIG. 3. At step 208, variable "i" is initialized to 1 to point to cell P. At step 210, the method determines that cell C is in the neighbor list of cell P. At step 212, the method increments counter set A in cell P's neighbor list. More specifically, the method increments the cell counter associated with cell C in cell P's neighbor list. This is shown in block 304 of FIG. 3. At step 214, the method determines that the cell counter associated with cell C has not reached its maximum value. At step 220, the method increments the active neighbor list counter (counter set A) for cell P's neighbor list. This is shown in block 304 of FIG. 3. At steps 222 and 224, the method determines that both the counter set A and counter set B neighbor list counters are less than the predetermined value, preferably 500. Because both of the neighbor list counters are less than the predetermined value, the neighbor list of cell P is prioritized based on the database in the RNC 104 of FIG. 1. As shown in block 304 of FIG. 3, the prioritization is D, C, M.

FIG. 4 provides an example of the method when cell C is added to the active set some time after system startup but before the first swap of counter set A and counter set B. In accordance with the flowchart of FIG. 2, at step 204, the method determines that system startup did not just occur. At step 208, variable "i" is initialized to 1 to point to cell P already in the active set. At step 210, the method determines that cell C is in the neighbor list of cell P. At step 212, the method increments counter set A in cell P's neighbor list. More specifically, the method increments the cell counter associated with cell C in cell P's neighbor list. This is shown in blocks 402 and 404 of FIG. 4 by cell C's counter increasing from 275 to 276. At step 214, the method determines that the cell counter associated with cell C has not reached its maximum value. At step 220, the method increments the active neighbor list counter (counter set A) for cell P's neighbor list. This is shown in blocks 402 and 404 of FIG. 4 by the neighbor list counter for counter set A increasing from 673 to 674. At step 222, the method determines that the neighbor list counter for counter set A of cell P's neighbor list is greater than the predetermined value. At step 226, the method prioritizes the order of cell P's neighbor list based on counter set A. Namely, the priority order is C, M, D.

FIG. 5 provides an example of the method when cell C is added to the active set some time after system startup but before the first swap of counter set A and counter set B. In this example, a cell counter in counter set A reaches its maximum value of 300. In accordance with the flowchart of FIG. 2, at step 204, the method determines that system startup did not just occur. At step 208, variable "i" is initialized to 1 to point to cell P already in the active set. At step 210, the method determines that cell C is in the neighbor list of cell P. At step 212, the method increments counter set A in cell P's neighbor list. More specifically, the method increments the cell counter associated with cell C in cell P's neighbor list. This is shown in blocks 502 and 504 of FIG. 5 by cell C's counter increasing from 299 to 300. At step 214, the method determines that the cell counter associated with cell C has reached its maximum value. At step 215, the method increments the neighbor list counter for counter set A. At step 216, the method clears the counters in counter set B (in this case, counter set B was already zero) of cell P's neighbor list. The method also clears the neighbor list counter for counter set B. At step 218, for cell P's neighbor list, the method makes counter set B (cell counters and neighbor list counter) the active counter and counter set A the standby counter. This is shown in block 504 of FIG. 5. At step 224, the method determines that the neighbor list counter for counter set A is greater than the predetermined value and prioritizes the order of cell P's neighbor list based on counter set A (step 228). According to block 504 in FIG. 5, the order is C, M, D.

FIG. 6 provides an example of the method when cell C is added to the active set some time after the first swap of counter set A and counter set B. In accordance with the flowchart of FIG. 2, at step 204, the method determines that system startup did not just occur. At step 208, variable "i" is initialized to 1 to point to cell P already in the active set. At step 210, the method determines that cell C is in the neighbor list of cell P. At step 212, the method increments counter set B in cell P's neighbor list. More specifically, the method increments the cell counter associated with cell C in cell P's neighbor list. This is shown in blocks 602 and 604 of FIG. 6 by cell C's counter increasing from 19 to 20. At step 214, the method determines that the cell counter associated with cell C has not reached its maximum value. At step 220, the method increments the active neighbor list counter (counter set B) for cell P's neighbor list. This is shown in blocks 602 and 604 of FIG. 6 by the neighbor list counter for counter set B increasing from 399 to 400. At step 222, the method determines that the neighbor list counter for counter set B is below the predetermined value. At step 224, the method determines that the neighbor list counter for counter set A is above the predetermined value and thus uses counter set A to prioritize cell P's neighbor list. According to FIG. 6, the order is C, M, D.

FIG. 7 provides an example of the method when cell C is added to the active set some time after the first swap of counter set A and counter set B. In this example, the neighbor list counter for counter set B reaches the predetermined value of 500. In accordance with the flowchart of FIG. 2, at step 204, the method determines that system startup did not just occur. At step 208, variable "i" is initialized to 1 to point to cell P already in the active set. At step 210, the method determines that cell C is in the neighbor list of cell P. At step 212, the method increments counter set B in cell P's neighbor list. More specifically, the method increments the cell counter associated with cell C in cell P's neighbor list. This is shown in blocks 702 and 704 of FIG. 7 by cell C's counter increasing from 50 to 51. At step 214, the method determines that the cell counter associated with cell C has not reached its maximum value. At step 220, the method increments the active neighbor list counter (counter set B) for cell P's neighbor list. This is shown in blocks 702 and 704 of FIG. 7 by the neighbor list counter for counter set B increasing from 499 to 500. At step 222, the method determines that the neighbor list counter for counter set B is equal to the predetermined value. At step 226, the method uses the values of counter set B to prioritize cell P's neighbor list as M, D, C.

FIG. 8 provides an example of the method when a cell M is added to the active set some time after the first swap of counter set A and counter set B. In this example, a cell counter in counter set B reaches the maximum value of 300. In accordance with the flowchart of FIG. 2, at step 204, the method determines that system startup did not just occur. At step 208, variable "i" is initialized to 1 to point to cell P already in the active set. At step 210, the method determines that cell M is in the neighbor list of cell P. At step 212, the method increments counter set B in cell P's neighbor list. More specifically, the method increments the cell counter associated with cell M in cell P's neighbor list. This is shown in blocks 802 and 804 of FIG. 8 by cell M's counter increasing from 299 to 300. At step 214, the method determines that cell M's counter in counter set B has reached the maximum value. At step 215, the method increments the neighbor list counter for counter set B. This is shown in blocks 802 and 804 of FIG. 8 by the neighbor list counter increasing from 500 to 501. At step 216, the method clears the counters in counter set A of cell P's neighbor list. The method also clears the neighbor list counter for counter set A. At step 218, for cell P's neighbor list, the method makes counter set A (cell counters and neighbor list counter) the active counter and counter set B the standby counter. This is shown in block 804 of FIG. 8. At step 224, the method determines that the neighbor list counter for counter set B is greater than the predetermined value and prioritizes the order of cell P's neighbor list based on counter set B (step 228). According to block 804 in FIG. 8, the order is M, D, C.

Figure 9:
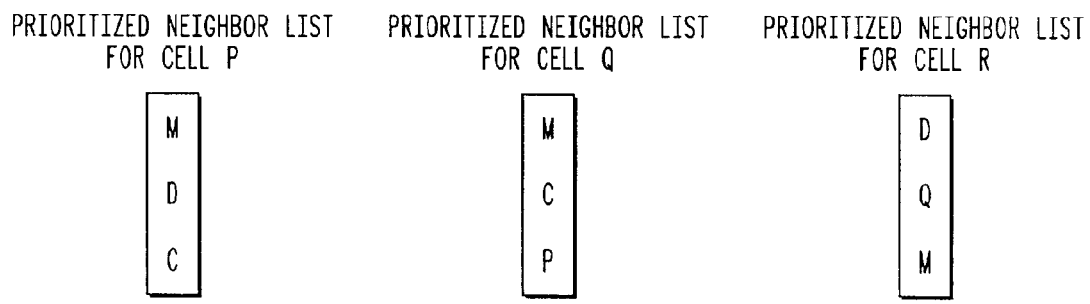
FIG. 9 is an example of prioritized neighbor lists for cells P, Q and R that are used to assemble a monitored list for the UE of FIG. 1.

For simplicity of explanation, the examples of FIGS. 3-8 assumed that the UE 106 (FIG. 1) had only one cell (cell P) already in its active set. Thus, the monitored set is created using the prioritized neighbor list for cell P. Using the results of the example in FIG. 8, the Monitored set includes cells M, D, C. The UE 106 may have multiple cells, such as cells P, Q and R, already in its active set. The neighbor lists of cells Q and R would have their own unique priority order of cells, such as M, C, P and D, Q, M, respectively, as shown in FIG. 9. In this case, a round robin selection from neighbor lists P, Q and R would be used to assemble the monitored list. For example, selecting from each list, the monitored list would include: (1) cell M (the highest priority cell in the neighbor list of cell P); (2) cell C (the second highest priority cell in the neighbor list of cell Q because the highest priority cell M has already been included in the monitored list); and cell D (highest priority cell in the neighbor list of cell R).

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims. For example, changes in system configuration, such as the removal of a cell from a neighbor list, may make it desirable to restart the prioritization process manually. A user command may be provided for this purpose. Such a command could force a swap of the active and standby counters (cell counters and neighbor list counters) and force a reset of the appropriate counters. Such action could be used to force the system to user the priority order provided in the RNC database.

What is claimed is:

1. A method of prioritizing a plurality of cells in a neighbor list of a cell in an active set comprising the steps of:
   for each cell of the plurality of cells in neighbor list a cell in an active set, tracking a number of times the cell of the plurality of cells in the neighbor list of a cell in an active set is added to the active set;
   tracking a number of times any cell of the plurality of cells in the neighbor list of a cell in an active set is added to the active set; and
   when the plurality of cells in the neighbor list of a cell in an active set have been added to the active set a predetermined amount of times, prioritizing the plurality of cells in the neighbor list.

2. The method of claim 1 wherein the step of tracking when a cell of the plurality of cells is added to the active set comprises:
   maintaining a first counter set for the plurality of cells, wherein the first counter set comprises a counter for each of the plurality of cells; and
   incrementing the counter in the first counter set corresponding to the cell that is added to the active set.

3. The method of claim 2 wherein the step of tracking when any cell of the plurality of cells is added to the active set comprises:
   maintaining a second counter for the neighbor list; and
   incrementing the second counter when any cell of the plurality of cells in the neighbor list is added to the active set.

4. The method of claim 3 wherein the step of prioritizing comprises:
   when the second counter reaches a predetermined value, ordering the plurality of cells in the neighbor list from a highest priority to a lowest priority, wherein the cell associated with the counter in the first counter set having a highest value is given the highest priority and the cell associated with the counter in the first counter set having a lowest value is given the lowest priority.

5. The method of claim 1 wherein the step of tracking the number of times the cell of the plurality of cells is added to the active set comprises:
   maintaining a plurality of counter sets for each cell of the plurality of cells, wherein each of the plurality of counter sets comprises a plurality of counters corresponding to the plurality of cells and wherein a first counter set of the plurality of counter sets is active and a second counter set of the plurality of counter sets is standby; and
   incrementing the counter in the active counter set corresponding to the cell that is added to the active set.

6. The method of claim 5 wherein the step of tracking when any cell of the plurality of cells is added to the active set comprises:
   maintaining a plurality of neighbor list counters, wherein a first neighbor list counter is active and a second neighbor list counter is standby; and
   incrementing the active neighbor list counter when any cell of the plurality of cells in the neighbor list is added to the active set.

7. The method of claim 5 further comprising the steps of:
   determining whether the counter in the active counter set corresponding to the cell that is added to the active set has reached a maximum value; and
   if the counter has reached the maximum value,
      incrementing the active neighbor list counter;
      clearing the standby counter set;
      clearing the standby neighbor list counter;
      swapping the active and standby counter sets
      swapping the active and standby neighbor list counters.

8. In a communications system wherein user equipment monitors a plurality of cells in a plurality of neighbor lists for inclusion in a monitored set and subsequent promotion to an active set, a method of prioritizing the plurality of cells in the plurality of neighbor lists comprising the steps of:
   detecting when a new cell has been added to the active set;
   for each cell$_i$ already in the active set,
      determining whether the new cell is included in the neighbor list of cell$_i$;

if the new cell is included in the neighbor list of $cell_i$, incrementing a counter in a first counter set associated with the new cell in the neighbor list of $cell_i$;

determining whether the counter in the first counter set has reached a maximum value;

if the counter in the first counter set has not reached the maximum value, incrementing a first neighbor list counter associated with the neighbor list of $cell_i$;

determining whether the first neighbor list counter has reached a predetermined value;

if the first neighbor list counter has reached the predetermined value, prioritizing the plurality of cells in the neighbor list of $cell_i$; and constructing the monitored set from the plurality of cells in the plurality of neighbor lists.

9. The method of claim 8 wherein the first counter set is active and the plurality of cells in the neighbor list of $cell_i$ has a second counter set that is standby, wherein the first neighbor list counter is active and each neighbor list of $cell_i$ has a second neighbor list counter that is standby, and wherein if a counter in the active counter set has reached the maximum value, the method further comprises the steps of:

incrementing the active neighbor list counter associated with the neighbor list of $cell_i$;

clearing the standby counter set of the plurality of cells in the neighbor list of $cell_i$;

clearing the standby neighbor list counter of the neighbor list of $cell_i$;

swapping the active and standby counter sets;

swapping the active and standby neighbor list counters;

determining whether the standby neighbor list counter for the neighbor list of $cell_i$ has reached a predetermined value; and if the standby neighbor list counter has reached the predetermined value, prioritizing the plurality of cells in the neighbor list of $cell_i$.

10. An apparatus for prioritizing a plurality of cells in a neighbor list of a cell in an active set comprising:

a radio network controller; and a processor running in the radio network controller wherein the processor when operative is configured to for each cell of the plurality of cells, track an amount of times the cell of the plurality of cells is added to the active set;

track an amount of times any cell of the plurality of cells is added to the active set; and when the plurality of cells have been added to the active set a predetermined amount of times, prioritize the plurality of cells in the neighbor list.

* * * * *